US009009382B2

(12) United States Patent
Sala et al.

(10) Patent No.: US 9,009,382 B2
(45) Date of Patent: Apr. 14, 2015

(54) USB HUBS WITH GALVANIC ISOLATION

(71) Applicant: Maxim Integrated Products, Inc., San Jose, CA (US)

(72) Inventors: Leonardo Sala, Cornaredo (IT); Kenneth Jay Helfrich, Duluth, GA (US)

(73) Assignee: Maxim Integrated Products, Inc., San Jose, CA (US)

( * ) Notice: Subject to any disclaimer, the term of this patent is extended or adjusted under 35 U.S.C. 154(b) by 182 days.

(21) Appl. No.: 13/624,862

(22) Filed: Sep. 21, 2012

(65) Prior Publication Data

US 2014/0089552 A1     Mar. 27, 2014

(51) Int. Cl.
*G06F 13/20*     (2006.01)
*G06F 13/40*     (2006.01)

(52) U.S. Cl.
CPC ...................................... *G06F 13/40* (2013.01)

(58) Field of Classification Search
USPC ......................................................... 710/313
See application file for complete search history.

(56) References Cited

U.S. PATENT DOCUMENTS

| 7,755,326 | B1 * | 7/2010 | Thivierge ...................... 320/116 |
| 8,432,182 | B2 * | 4/2013 | Gaalaas et al. .................. 326/30 |
| 2005/0268006 | A1 * | 12/2005 | Julicher et al. .................... 710/62 |
| 2006/0155908 | A1 * | 7/2006 | Rotvold et al. ................ 710/315 |
| 2009/0265057 | A1 * | 10/2009 | Chinnadurai et al. .......... 701/29 |
| 2009/0327558 | A1 * | 12/2009 | Landry et al. .................. 710/301 |
| 2010/0057388 | A1 * | 3/2010 | LeBrun ........................... 702/67 |
| 2011/0013624 | A1 * | 1/2011 | Lerzer et al. ................... 370/360 |
| 2014/0211862 | A1 * | 7/2014 | Moghe et al. .................. 375/256 |

FOREIGN PATENT DOCUMENTS

| CN | 202145311 U | * | 2/2012 | ............. G06F 13/38 |
| CN | 102436433 A | * | 5/2012 | ............. G06F 13/38 |
| RU | 2148273 C1 | * | 4/2000 | ............. G06F 13/00 |

OTHER PUBLICATIONS

Culurciello et al., "Monolithic digital galvanic isolation buffer fabricated in silicon on sapphire CMOS," Electronics Letters , vol. 41, No. 9, pp. 526-528, Apr. 28, 2005.*
Frick et al., "A mixed-signal ASIC in CMOS technology for industrial AC current sensing with galvanic isolation," Industrial Electronics, 2002. ISIE 2002. Proceedings of the 2002 IEEE International Symposium on , vol. 1, pp. 99-104, 2002.*
Pavlovsky et al., "Reaching High Power Density in Multikilowatt DC-DC Converters With Galvanic Isolation," Power Electronics, IEEE Transactions on , vol. 24, No. 3, pp. 603-612, Mar. 2009.*

(Continued)

*Primary Examiner* — Faisal M Zaman
(74) *Attorney, Agent, or Firm* — TIPS Group

(57) ABSTRACT

A universal serial bus (USB) hub includes a USB AFE circuit module, a hub core and an isolator circuit module interposed between the USB AFE circuit module and the hub core. Data communications between the hub core and the first USB AFE circuit module pass through the isolator circuit module. A method for communicating through a universal serial bus hub includes providing a USB AFE circuit module, providing a hub core, providing an isolator circuit module interposed between the USB AFE circuit module and the hub core, and directing communication from the USB AFE circuit module to the hub core through the isolator circuit module.

18 Claims, 4 Drawing Sheets

(56) References Cited

OTHER PUBLICATIONS

Batrakov et al., "Synchronization circuit with galvanic isolation for high-current accelerator REB of microsecond duration," Microwave & Telecommunication Technology, 2005 15th International Crimean Conference, vol. 2, pp. 707-708, Sep. 16, 2005.*
Analog Devices, Inc., "Full/Low Speed 5 kV USB Digital Isolator," Data Sheet, ADuM4160, Analog Devices, Inc., 2009-2012, pp. 1-16.

* cited by examiner

USB HUBS WITH GALVANIC ISOLATION

CROSS REFERENCE TO RELATED APPLICATION(S)

This application is related to co-pending non-provisional patent application U.S. Ser. No. 13/168,919, filed Jun. 24, 2011, for "Virtual Hubs for Communication Interface", which is incorporated herein by reference in its entirety.

BACKGROUND

Digital communication interfaces have become widespread with modern technology's emphasis on rapid transfer and communication of digital data for an ever-increasing amount of important functions including data storage, output transmission, and device control. These interfaces include standard communication specifications such as Universal Serial Bus (USB), Serial Advanced Technology Attachment (SATA), Firewire®, etc. These interfaces are used in a number of applications for computers and other electronic devices.

USB, for example, is a commonly-used interface standard that allows data communication between a host and one or more peripheral devices. Communication in a USB interface can use a variety of formats and speeds. In general, "low speed" or "LS" has a data transfer rate of 1.5 Mbit/s, "full speed" or "FS" has a data transfer rate of 12 Mbit/s, "high speed" or "HS" has a data transfer rate of 480 Mbit/s, and "super speed" or "SS" has a data transfer rate of 5 Gbit/s.

A host controller can communicate with the peripheral devices using a USB communication interface, A USB communication interface (or "system") can include one or more USB hubs that can connect multiple peripheral devices, in series, to the host. Typically, each USB hub has multiple downstream ports other USB hubs or directly to peripheral devices.

FIG. 1 (Prior Art) is a block diagram of a conventional USB hub 100 which includes an "upstream" Universal Serial Bus (USB) High Speed (HS) Analog Front End (AFE) ("USB HS AFE") block 104, a "downstream" USB HS AFE block 106, and hub core 102. Although only a single downstream HS AFE block is shown, typically more than one can be present. HS AFE blocks 104 and 106 provide the analog interface for cables (not shown) connected to hub 100 from other outboard devices, a host device, or hubs, as well as the digital interface to the circuitry in the hub core 102. Although labeled as HS, blocks 104 and 106 can handle traffic at the slower speeds of LS and FS as well. Typically, the digital data busses connecting HS AFE blocks 104 and 106 to hub core 102 are based on the UTMI (USB Transceiver Macrocell Interface) protocol which may have as many as 40 or 50 interconnect lines.

The hub core 102 includes hub controller 108, which is used for various control functions of the hub, including receiving configuration commands from a host device (not shown) and maintaining communication with the host device. The transaction translator (TT) 110 is included in the hub core to respond to high speed (HS) split transactions and translate them (if needed) into full speed (FS) or low speed (LS) transactions compatible with any full-speed or low-speed devices attached on downstream-facing ports of the hub. Port routing logic 112 is included in the hub core to route high-speed packets between particular downstream ports and the upstream port, as well as distribute low-speed and full-speed packets between downstream ports and the transaction translator 110. Upstream port logic block 116 and downstream ports logic block 118 control the USB-specific signaling detected by and generated by the hub. Each hub 100 re-clocks data to provide its own locally-clocked output data (e.g., to control jitter) in upstream and downstream directions to provide a signal having the proper timing. The upstream and downstream ports logic blocks 116, 118 each include a clock and data recovery (CDR) block to recover the clock signal based on edges of the data stream, as well as an elasticity buffer to buffer the signal as needed for clock recovery.

Applications for USB communication interfaces (including USB hubs) are continually expanding with a wide variety of devices being equipped with USB interfaces. As these devices extend further from the host device, particularly in industrial environments, issues such as voltage spikes, ground loops, and surges can negatively impact the integrity of the data being transmitted over the USB bus. To address these issues, it would be desirable to have galvanic isolation incorporated with the USB communication interface.

Galvanic isolation typically prevents the interconnection of DC voltages and currents across the isolation interface. Low frequency AC voltages can also be isolated (such as 50-60 Hz line power frequencies) if the data being transmitted is of a considerably higher frequency. Devices such as coupling capacitors, transformers, or photo-optical devices are commonly used for galvanic isolation for high speed electronic data. Less common are the use of mechanical or sonic isolators, since their frequency response may be inadequate for high speed data transmission. Typically, industrial applications can require as high as 2500 Volts RMS isolation.

It has been found that galvanic isolation can introduce its own set of problems, particularly with high speed (480 MHz) USB devices. Placing any component, such as a transformer, in series with the data communication busses will introduce a transmission lag that will impact the relative timing (or jitter) of the signals.

The high speed USB specification has tightened up the jitter requirements significantly over the earlier "full speed" and "low speed" jitter requirements. As such, prior art devices that functioned properly at "full speed" and "low speed" due to relaxed jitter requirements can no longer function at the "high speed" data rates of 480 MHz. For example, Analog Devices part number AduM4160, which can operate at low speed or high speed, utilizes monolithic air core transformers which function as the isolation devices. When operating at high speed, and under certain conditions (e.g. with long cabling), this device may have difficulties in meeting USB transmission lag and jitter specifications.

These and other limitations of the prior art will become apparent to those of skill in the art upon a reading of the following descriptions and a study of the several figures of the drawing.

SUMMARY

In an embodiment, set forth by example and not limitation, a universal serial bus (USB) hub includes a USB AFE circuit module, a hub core and an isolator circuit module interposed between the USB AFE circuit module and the hub core. Data communications between the hub core and the first USB AFE circuit module pass through the isolator circuit module which serves to provide galvanic isolation between the hub core and first USB AFE circuit module while meeting high speed USB transmission lag and jitter specifications.

In an embodiment, set forth by example and not limitation, a method for communicating through a universal serial bus hub includes providing a USB AFE circuit module, providing a hub core, providing an isolator circuit module interposed between the USB AFE circuit module and the hub core, and directing communication from the USB AFE circuit module to the hub core through the isolator circuit module. The method provides effective galvanic isolation while meeting high speed USB transmission lag and jitter specifications.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures.

DETAILED DESCRIPTION OF EXAMPLE EMODIMENTS

In example embodiments, set forth by way of example and not limitation, galvanic isolation is combined with the logic of a USB hub. Using the functionality present within each hub, problems such as bus turnaround delays, HS and FS compliance, LS device support, and the need for retiming and re-driving signals can be reduced. Time delays, jitter issues, and cost of the isolation devices can be further reduced with the use of a serialized data interface (called an Ultra Low Pin Count Interface, or ULPI) which reduces the total number of data lines passing through the isolation device.

Figure 1:
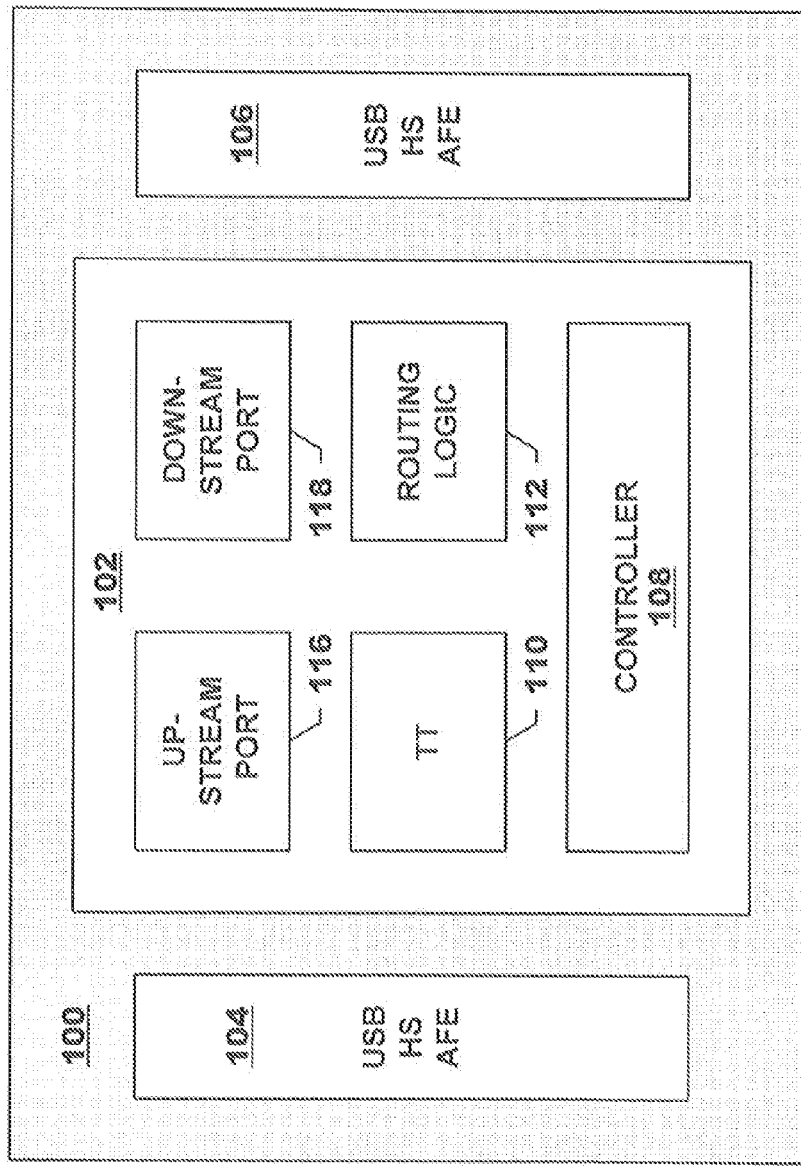
FIG. 1 (Prior Art) is a block diagram of a conventional USB hub.
Figure 2A:
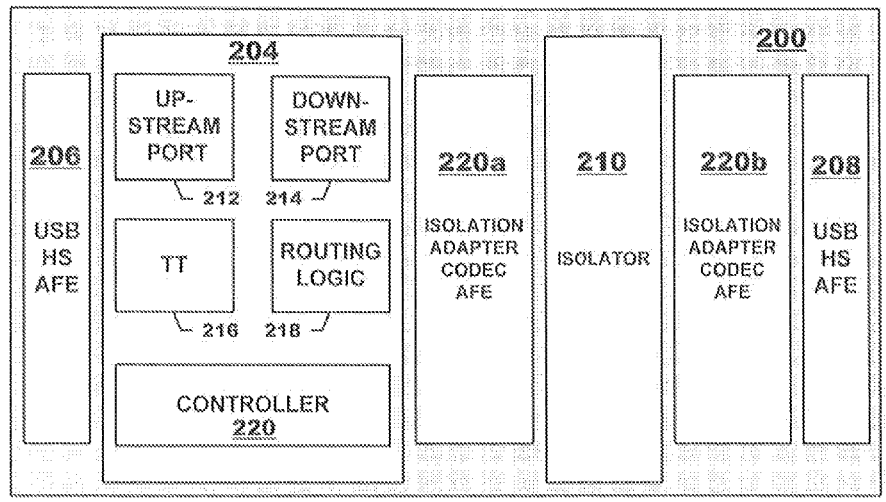
FIG. 2a is a block diagram of a USB hub having incorporated galvanic isolation in accordance with a first example embodiment.

FIG. 2a is a block diagram of a USB hub 200 having incorporated galvanic isolation in accordance with a first example embodiment. For example, USB hub 200 may be partially or fully implemented as a part of an integrated circuit (IC). Upstream USB HS AFE block 206 and downstream USB HS AFE block 208 have a function similar to HS AFE blocks 104 and 106 described previously. For purposes of this disclosure, "upstream" shall mean ports or circuitry closest to a host device (relative to the hub core 204) while "downstream" shall mean the ports or circuitry not closest to the host device. Communications from a host device to hub 200 enter hub 200 via USB HS AFE block 206. Communications from hub 200 to subsequently connected devices "downstream" would proceed through USB HS AFE block 208. Hub core 204 containing logic blocks 212-220 performs as previously described for hub core 102 of FIG. 1.

In this example embodiment, galvanic isolation is implemented with an isolator (or "isolation") block 210, an isolation adapter 220a, and an isolation adapter 220b. Isolation block 210 includes isolation components such as coupling/blocking capacitors, inductive transformers, or photo-optical components (opto-isolators) and/or other suitable devices and technologies as appreciated by those of skill in the art. Preferably, the isolation components are fast enough to pass data streams with sufficiently short time delays and jitter meet the voltage isolation requirement specified for the device.

Isolation adapters 220a and 220b convert the rather large number of signal lines of the UTMI interface (typically used between hub core 204 and USB HS AFE block 208, for example) to a reduced data line count interface (ULPI) in this non-limiting example. Reducing the number of data lines reduces the total number of individual isolation components required (within isolator 210) which simplifies construction, reduces component counts/cost, and subsequently reduces die sizes due to lower counts of large passive components such as capacitors or inductors/transformers. The isolation block 210 couples the hub core 204 to the downstream USB HS AFE block 208. If there are multiple downstream HS AFE blocks (not shown) they would also reside on the downstream side of isolation block 210 (and adapter 220b).

Figure 2B:
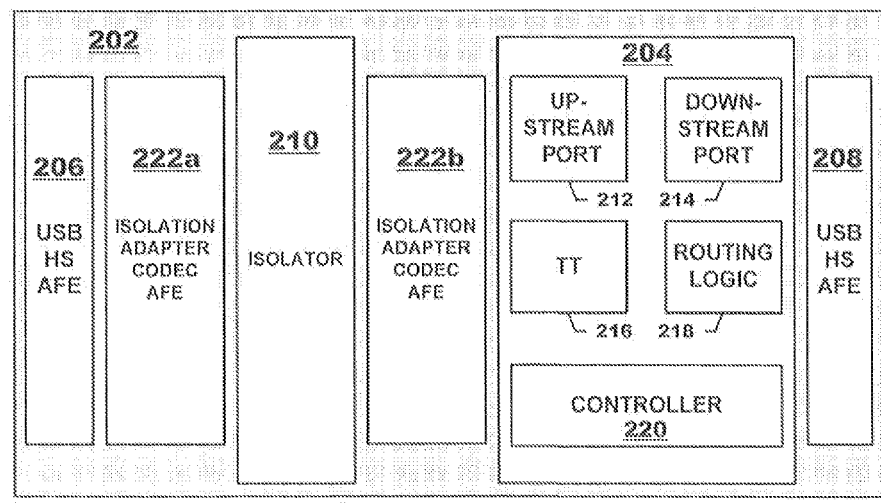
FIG. 2b is a block diagram of a USB hub having incorporated galvanic isolation in accordance with a second example embodiment.

FIG. 2a illustrates another example configuration for galvanic isolation of a USB hub 202. As seen in FIG. 2b, isolator block 210 and isolation adapters 222a and 222b are located between the upstream USB HS AFE block 206 and hub core 204. Isolation adapters 222a and 222b have the same UTMI to ULPI conversion structure as Isolation adapters 220a and 220b, respectively, as described for the example embodiment of FIG. 2a. While the basic functionality of the embodiments of FIGS. 2a and 2b will be similar, there may be logistics reasons (such as the number and type of upstream and downstream USB devices) and the operating environment to favor one configuration over the other.

Figure 3:
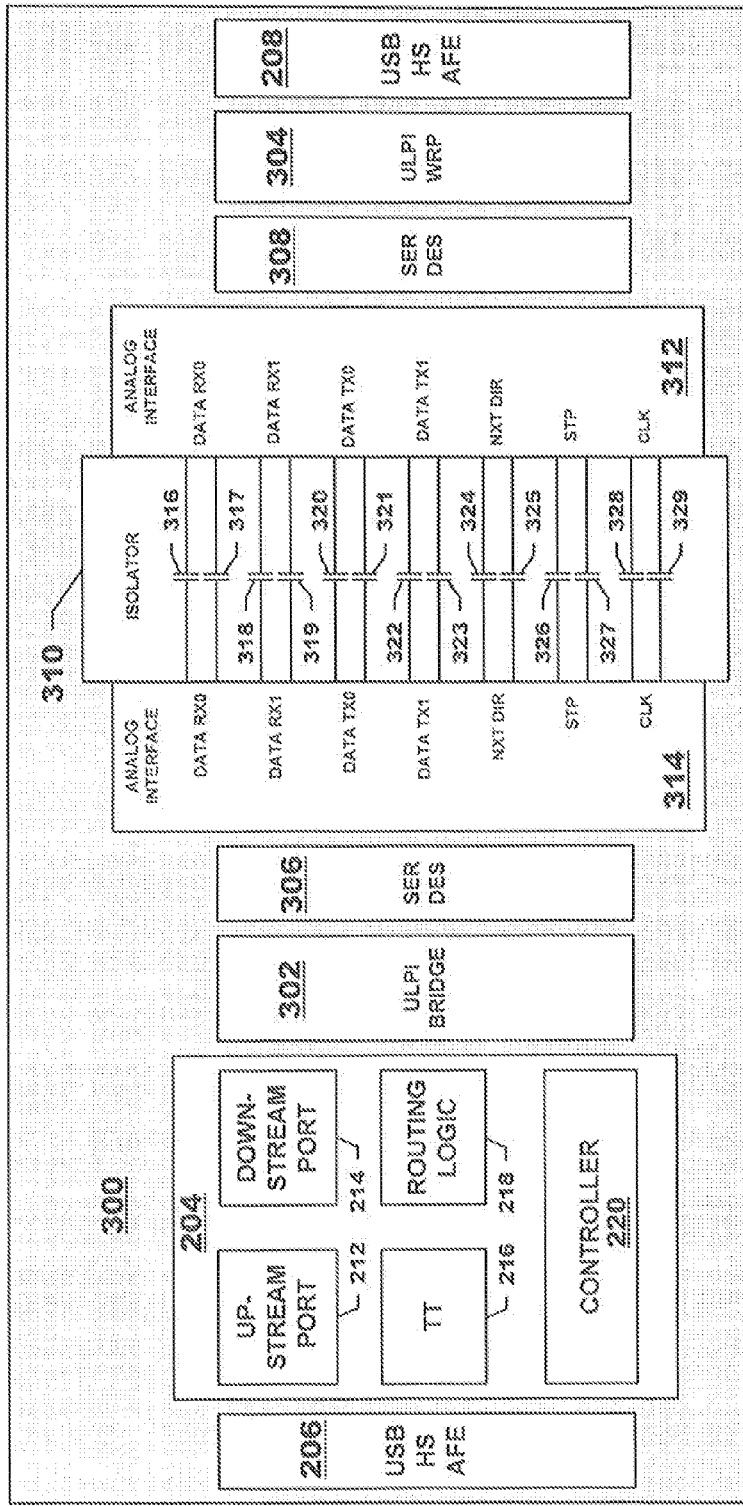
FIG. 3 is a block diagram of an example USB hub having capacitor galvanic isolation.

FIG. 3 is a block diagram of an example USB hub 300 having capacitor galvanic isolation. USB hub 300 can be partially or fully implemented as a part of an integrated circuit (IC) as will be appreciated by those of skill in the art. The details illustrated in hub 300 are provided by way of example and not limitation for, as has been previously stated, other isolation components can also be utilized and can be located in more than one location.

In FIG. 3, a capacitance isolator 310 is placed between the hub core 204 and the downstream USB HS AFE block 208 in a similar configuration as that shown in FIG. 2a. As will be appreciated by those skilled in the art, capacitance isolator 310 can also be placed between the upstream USB HF AFE block 206 and hub core 204, as illustrated in FIG. 2b. Isolation Adapter AFE 220a of FIG. 2a, in a first example, includes three modules upstream of Isolator 310 in FIG. 3, namely ULPI Bridge 302, parallel to serial converter SER DES 306, and analog interface 314. Isolation Adapter AFE 220b of FIG. 2b, in a second example, includes three modules downstream of Isolator 310 in FIG. 3, namely ULPI WRP 304, parallel to serial converter SER DES 308, and analog interface 312.

In this non-limiting example, isolator 310 provides seven communication lines where each line includes a differential pair coupled by capacitors 316-329. In this example, capacitors provide the appropriate galvanic isolation. Preferably, in this example, data transfer is unidirectional to facilitate isolation performance. The ULPI conversion allows for a minimum of five communication interconnect lines, where two of the communication interconnect lines are bi-directional. These two bi-directional lines are converted into two transmit unidirectional data lines (DATA TX0 and TX1) and two receive unidirectional data lines (DATA RX0 and RX1) to facilitate enhanced operation of the isolator.

The employment of the ULPI conversion allows a considerable reduction in the number of coupling capacitors that are needed in the isolator, versus the number required if the UTMI bus from the USB HS AFE were utilized directly. Minimizing the number of coupling isolation capacitors has the advantage of keeping costs down, while also keeping integrated circuit die sizes manageable if these are integrated within the die. By way of non-limiting example, these capacitors can have rated voltages of at least about 2.5 kV. The isolation capacitors can, in various embodiments, be provided as part of an IC ("on chip") or external to an IC ("off chip").

Analog interfaces 312 and 314 contain circuitry to properly transmit and recover signals passed through capacitor array 316-329. ULPI Bridges 302 and 304 in conjunction with serial converters 306 and 308 convert the UTMI based data interfaces of the hub core 204 and the USB HS AFE block 208 to the modified ULPI data line count of seven communication lines. As a result of the UTMI to ULPI conversion, data rates are increased from 60 z (UTMI) to 240 MHz in ULPI.

Figure 4:
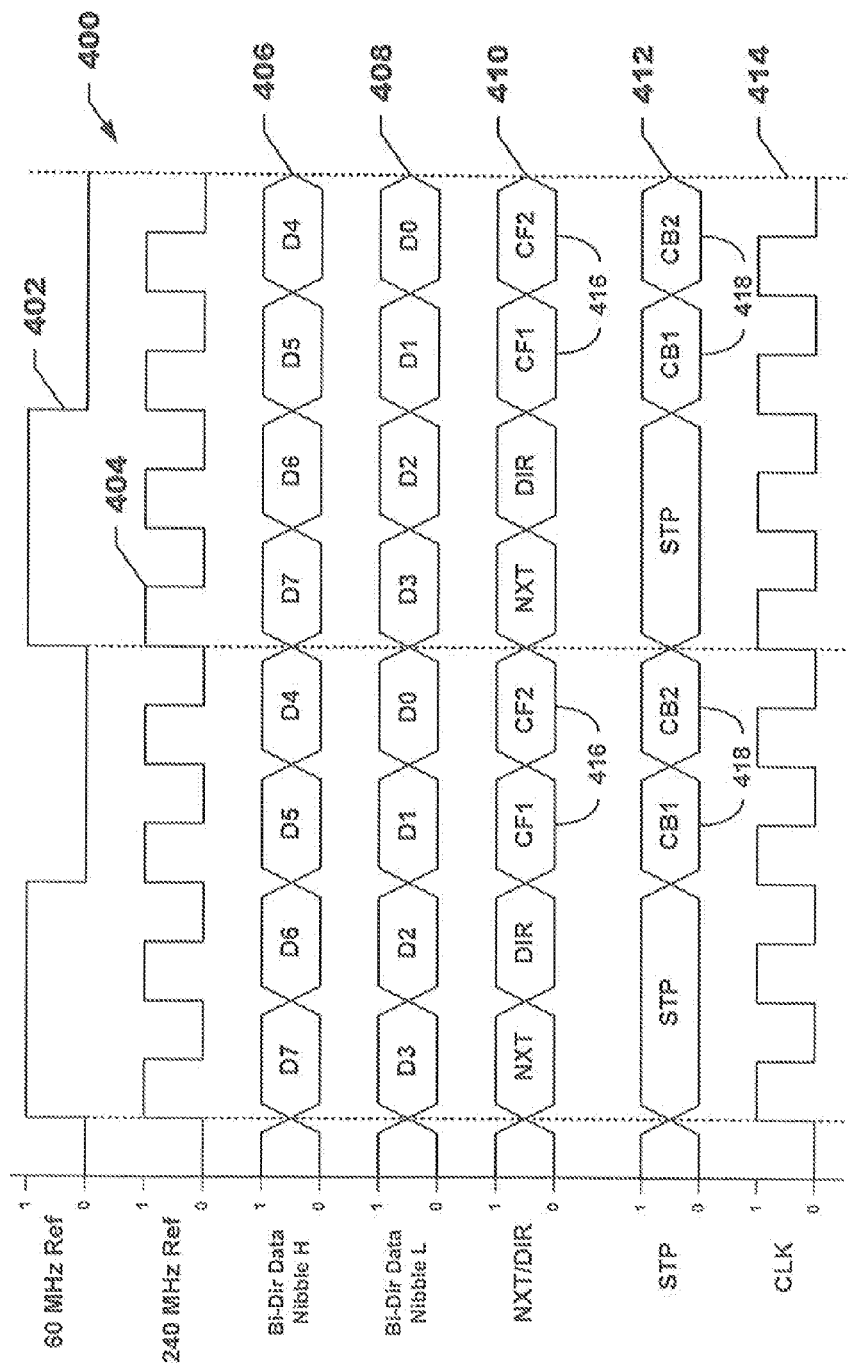
FIG. 4 is a signal timing diagram of a USB hub having a ULPI interface.

FIG. 4 is a signal timing diagram 400 of a USB hub having a ULPI interface, set forth by way of example and not limitation. Plots 402 and 404 are reference clocks at 60 MHz and 240 MHz, respectively. Two bi-directional data streams are shown as 406 and 408, which represents the lowest data line configuration of the ULPI interface. In this example, bi-directional lines 406 and 408 are spilt into four unidirectional data lines (two transmit and two receive), for reasons set forth previously with respect to the discussion of FIG. 3. NXT/DIR signals are shown in plot 410, STP is shown in plot 412, and STP and CLK signals are shown in plots 412 and 414, respectively. Due to the reduced data line count of the ULPI interface, data is transmitted at the 240 MHz clock rates, as opposed to the 60 MHz clock rate of the standard UTMI protocol. This configuration also allows additional data to be packaged within the NXT/DIR and STP data lines. Two additional data bits can be added to each data line, if desired. These are represented by data bits 416 (CF1, CF2) imbedded in the NXT/DIR signal stream 410, and data bits 418 (CB1, CB2) imbedded in the STP signal stream 412. This information can be used for any suitable purpose, such as, for example, enabling low power or sleep modes.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A universal serial bus hub comprising:
    a Universal Serial Bus (USB) Analog Front End (AFE) circuit module;
    a hub core;
    an isolator circuit module interposed between said USB AFE circuit module and said hub core, such that data communications between said hub core and said USB AFE circuit module pass through said isolator circuit module, said isolator circuit module serving to provide galvanic isolation between said hub core and USB AFE circuit module;
    a first isolation adapter circuit module interposed between said USB AFE circuit module and said isolator circuit module, such that data communications between said USB AFE circuit module and said isolator circuit module pass through said first isolation adapter circuit module, wherein said first isolation adapter circuit module comprises a first analog interface circuit module coupled to said isolator circuit module and a first parallel to serial converter module coupled to said first analog interface circuit module and said USB AFE circuit module; and
    a second isolation adapter circuit module interposed between said isolator circuit module and said hub core, such that data communications between said hub core and said isolator circuit module pass through said second isolation adapter circuit module, wherein said second isolation adapter circuit module comprises a second parallel to serial converter module coupled to said hub core and a second analog interface circuit module coupled to said second parallel to serial converter module and said isolator circuit module.

2. A hub as recited in claim 1 wherein said USB AFE circuit module is upstream of said hub core.

3. A hub as recited in claim 1 wherein said USB AFE circuit module is downstream of said hub core.

4. A hub as recited in claim 1 wherein a number of data communication lines between said first isolation adapter circuit module and said isolator circuit module is less than a number of communication lines between said first isolation adapter circuit module and said USB AFE circuit module.

5. A hub as recited in claim 4 wherein said first isolation adapter includes:
    a first Ultra Low Pin Count Interface (ULPI) bridge circuit module coupled to said USB AFE circuit module;
    wherein said first parallel to serial converter module is coupled to said first ULPI bridge circuit module.

6. A hub as recited in claim 5 wherein said isolator circuit module includes seven pairs of capacitive coupled data interconnect lines, said capacitive coupled interconnect lines serving to connect said isolator circuit module with said first analog interface circuit module.

7. A hub as recited in claim 6 wherein data transfer through said isolator circuit module is unidirectional.

8. A hub as recited in claim 5 wherein said isolator circuit module includes seven pairs of transformer coupled data interconnect lines, said transformer coupled interconnect lines serving to connect said isolator circuit module with said first analog interface circuit module.

9. A hub as recited in claim 1 wherein a number of data communication lines between said second isolation adapter circuit module and said isolator circuit module is less than a number of communication lines between said second isolation adapter circuit module and said hub core.

10. A hub as recited in claim 9 wherein said second isolation adapter includes:
    a second ULPI bridge circuit module, said second ULPI bridge circuit module coupled to said hub core;
    wherein said second parallel to serial converter module is coupled to said second ULPI bridge circuit module.

11. A hub as recited in claim 10 wherein said isolator circuit module includes seven pairs of capacitive coupled data interconnect lines, said capacitive coupled interconnect lines serving to connect said isolator circuit module with said second analog interface circuit module.

12. A hub as recited in claim 11 wherein data transfer through said isolator circuit module is unidirectional.

13. A hub as recited in claim 10 wherein said isolator circuit module includes seven pairs of transformer coupled data interconnect lines, said transformer coupled interconnect lines serving to connect said isolator circuit module with said second analog interface circuit module.

14. A method for communicating through a universal serial bus hub comprising:
    applying a communication to a Universal Serial Bus Analog Front End (USB AFE) circuit module;

directing said communication from said USB AFE circuit module to an isolator circuit module, wherein said communication is directed from said USB AFE circuit module to said isolator circuit module with a first isolation adapter circuit module, said first isolation adapter circuit module comprising a first analog interface circuit module coupled to said isolator circuit module and a first parallel to serial converter module coupled to said first analog interface circuit module and said USB AFE circuit module; and directing said communication from said isolator circuit module to a hub core, wherein said communication is directed from said isolator circuit module to said hub core with a second isolation adapter circuit module, said second isolation adapter circuit module comprising a second parallel to serial converter module coupled to said hub core and a second analog interface circuit module coupled to said second parallel to serial converter module and said isolator circuit module.

15. A method as recited in claim 14 wherein said USB AFE circuit module is upstream of said hub core.

16. A method as recited in claim 14 wherein said USB AFE circuit module is downstream of said hub core.

17. A method as recited in claim 14 wherein said isolator circuit module comprises seven pairs of capacitive coupled unidirectional data interconnect lines.

18. A method as recited in claim 14 wherein said first and said second isolation adapter circuit modules each comprise an Ultra Low Pin Count Interface (ULPI) bridge circuit module.

* * * * *